United States Patent [19]
Sykes

[11] Patent Number: 5,370,488
[45] Date of Patent: Dec. 6, 1994

[54] CONNECTOR

[76] Inventor: Christopher C. Sykes, 211 Queens Quay West, Apartment 902, Toronto, Ontario, Canada, M5J 2M6

[21] Appl. No.: 151,290

[22] Filed: Nov. 12, 1993

[51] Int. Cl.⁵ .............................................. F16B 21/00
[52] U.S. Cl. ..................................... 411/551; 411/85; 411/552
[58] Field of Search ............... 411/549, 551, 552, 553, 411/84, 85

[56] References Cited

U.S. PATENT DOCUMENTS

| | | | |
|---|---|---|---|
| 2,390,325 | 12/1945 | Rapp | 411/551 X |
| 3,816,882 | 6/1974 | Maeda et al. | 411/549 |
| 4,442,571 | 4/1984 | Davis et al. | 411/552 |
| 4,789,287 | 12/1988 | Le | 411/551 X |
| 4,801,232 | 1/1989 | Hempel | 411/552 |
| 4,830,531 | 5/1989 | Condit et al. | 411/552 X |
| 4,881,349 | 11/1989 | Brown et al. | 52/127.11 |

OTHER PUBLICATIONS

Southco Inc. "Southco Fasteners Handbook 40", 1990, 3 sheets incl. p. B-9.

*Primary Examiner*—Neill R. Wilson
*Attorney, Agent, or Firm*—Ridout & Maybee

[57] ABSTRACT

A connector for juxtaposed elements which are provided with laterally elongated holes therethrough, has a shaft which has a laterally elongated head portion at one end. A rotation blocking member has a washer portion through which the shaft passes, and a blocking portion extending from the washer portion. A reaction member preferably a threaded nut engages the end of the shaft opposite the head portion. In use, in an assembled position for insertion through the holes of the juxtaposed elements, the head portion is disposed in register with the blocking portion on the forward end thereof. Preferably, a spring between the nut and the washer portion tends to retract the shaft relative to the washer portion so that the head portion is lodged in compression on the end of the blocking portion. The shaft is rotated to move the head portion out of register with the blocking portion and to engage a side surface of the blocking portion which itself is non-rotatable within the slot. The shaft is retracted, preferably with the assistance of the spring, and by rotation of the nut, to clamp the elements tightly together between the nut and the head portion.

11 Claims, 2 Drawing Sheets

CONNECTOR

The present invention relates to a connector and more particularly to a connector for juxtaposed elements provided with elongated holes therethrough. For example, the connector may be used for joining together the sides of frames forming partition structures as described in applicant's U.S. Pat. No. 4,905,428 dated Mar. 6, 1990, or for connecting such frames to corner structure, such frames or structure being modified by being provided with elongated holes.

It is desirable to provide a connector which may be applied and actuated from one side of one of the two elements to be joined without needing to manipulate the connector device from two sides at once. Toggle connectors have been employed, but the known connectors rely on the pressure of resiliently compressible spacers which are interposed between the two juxtaposed elements and the use of these resilient spacers is not always desirable or convenient.

The present invention provides a connector for two juxtaposed elements each provided with an elongated hole therethrough, comprising a shaft having at one end a laterally elongated head portion insertable through said holes and rotatable to a locking position having said head portion engaged on an outer face of one of said elements, a rotation blocking member having at least one portion adapted to extend through the holes and block rotation of the shaft from the locking position, and a reaction member adapted to apply tensile force to an end of the shaft opposite said head portion and maintain the elements under compression between the reaction member and said head portion.

With this arrangement, the connector may be applied from one side of the two juxtaposed elements, without requiring access to or manipulation from the opposite side, and resilient spacers are not required An example of the connector in accordance with the invention will now be described with reference to the accompanying drawings.

Figure 1:
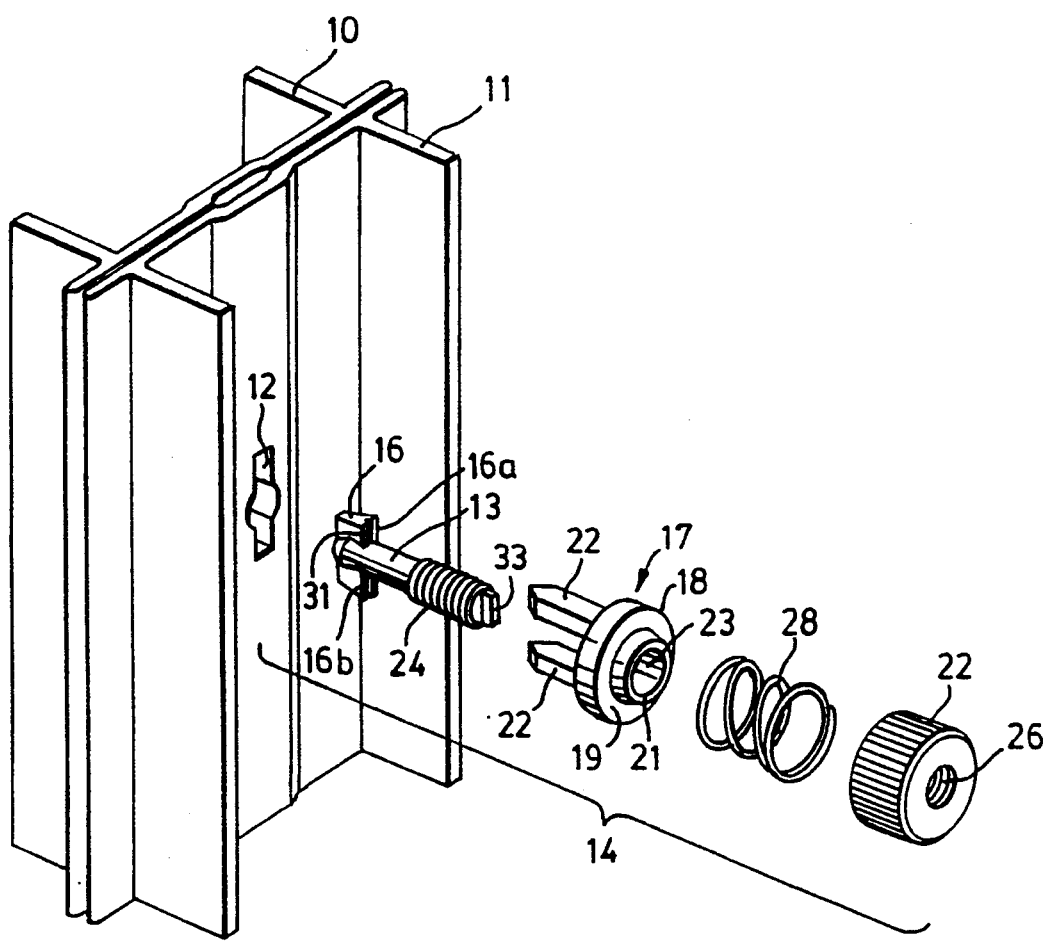
FIG. 1 is a partial perspective view showing portions of two frame elements to be connected together, and the components of one embodiment of a connector of the invention shown in exploded form.

Referring to the drawings, two channel section elements 10 and 11 are shown with the outer sides of the channel bases in face to face juxtaposition. Each is provided through generally planar portions thereof with a laterally elongated keyhole-like slot 12 which as seen is preferably of generally narrow rectangular form with a widened central circular portion adapted to receive snugly or with small clearance a generally circular shaft 13 forming part of the connector 14. The elements 10 and 11 may, for example, comprise side members of the rectangular frames of partition elements as described in the U.S. patent referred to above. Such side members may be punched to provide them with keyhole slots 12 at standard spacings so that a connection may be formed at pre-selected points along the length of the side of the frame.

Figure 2:
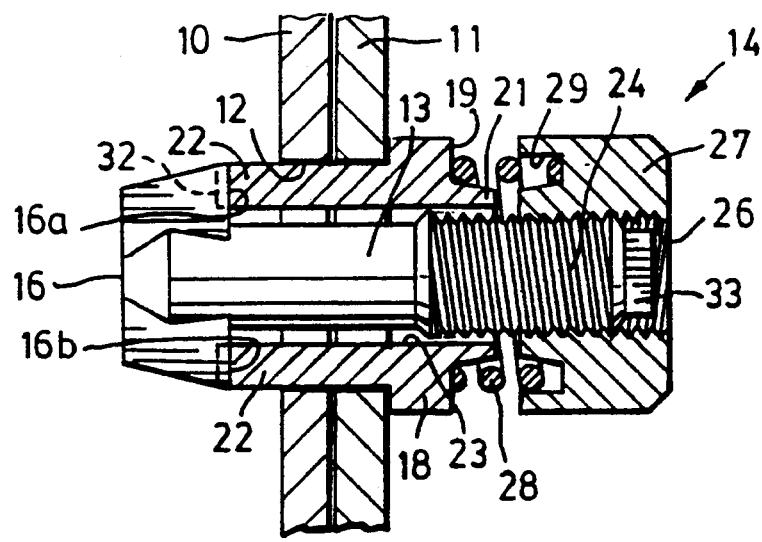
FIG. 2 is a cross-section showing the connector of FIG. 1 in assembled form inserted through the frame elements.
Figure 3:
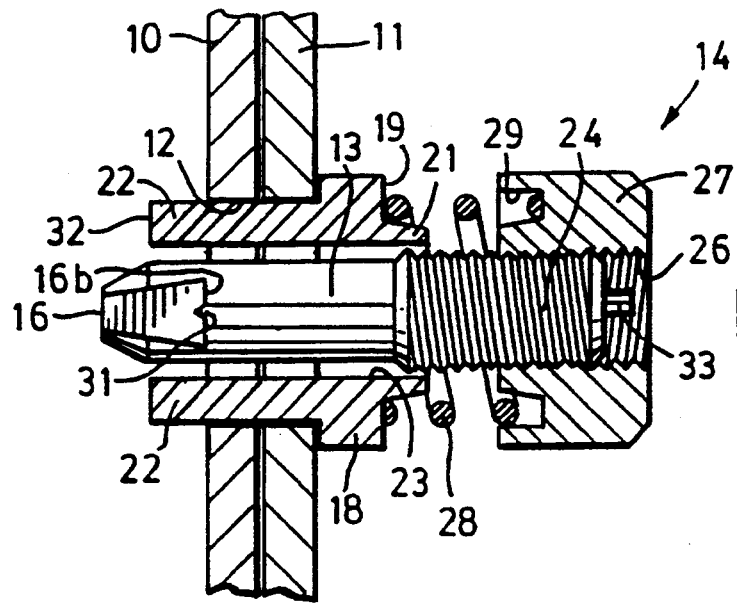
FIGS. 3 and 4 are cross-sections similar to FIG. 2 showing successive stages in the operation of the connector.
Figure 4:
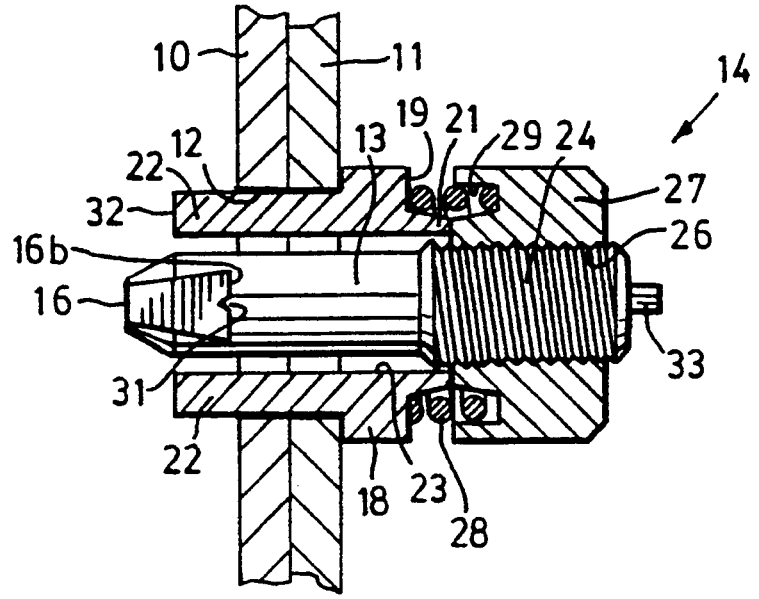

The shaft 13 is formed at one end with a head portion 16 which is T-shaped in effect having two lobes one on each side of the shaft 13 and sized to fit snugly or with small clearance through the slot 12. Preferably, as seen in FIGS. 2 to 4, the head 16 tapers in thickness and in width towards the front end to assist passing it through the slots 12.

A rotation blocking member 17 comprises an annular washer portion 18 formed integrally on a rear face 19 with a raised annular collar 21. On its front face the member 17 is formed with two longitudinally extending rectangular section blocking portions 22. The portions 22 are spaced apart on opposite sides of the washer portion 18 sufficiently to allow the shaft 13 to pass between them and through a hole 23 through the washer and collar portions 18 and 21. The blocking portions 22 are of width similar to the rear faces 16a and 16b of the parts of the head 16 extending on opposite sides of the shaft 13, respectively, and thus fit through the holes 12 snugly or with small clearance.

A threaded rear end 24 of the shaft 13 passes freely through the hole 23 in the washer and collar portions 18 and 21 parallel to the blocking portions 22 and engages the thread of a threaded bore 26 formed through a rounded or circular nut 27. Preferably, the outer side of the nut 27 is knurled as best seen in FIG. 1.

A helical compression spring 28 is trapped between the rear face 19 of the washer portion 18 and the nut 27, and at one end is located around the collar portion 19 and at the opposite end in an annular recess 29 formed on the inner or front side of the nut 27.

In the assembled insertion position of the connector 14, as seen in FIG. 2, the head 16 is in register with the blocking portions 22 so that the rear faces 16a and 16b abut the front of the portions 22, and the nut 27 is threaded onto the shaft 13 until there is small spacing between the front of the nut 27 and the collar portion 21, compressing the spring 28. The spring reaction tends to retract the shaft 13 and head portion 16 relative to the blocking member. Preferably, there is a detent action resisting rotation of the head portion 16 relative to the portion 22.

In the example illustrated, the detent action is provided by interengaging grooves 31 formed in the rear faces 16a and 16b and tapered projections 32 formed on the front of the portions 22 and pressed against the grooves 31 by the action of spring 28.

In use, the connector 14 in the assembled insertion position is passed through the aligned holes 12 in the juxtaposed elements 10 and 11, as seen in FIG. 2. Light finger pressure is applied to the nut 27, pushing the shaft 13 and head portion 16 forwardly, against the action for the spring 28, so that the head portion 16 clears the tapered end portions or projections 32. The knurled outer side of the nut 27 is grasped and the nut 27 is rotated through a quarter turn and, because of friction between the threads of the threaded bore 26 and the threaded rear end 24, the shaft rotates correspondingly until the head 16 is out of register with the blocking portion 22. Accordingly, when finger pressure is released, the pressure of the spring 28 retracts the shaft 13 and head portion 16 to the rotation blocking or retracted position seen in FIG. 3 wherein the rear faces 16a and 16b of the head portion engage the outer side of the element 10 on each side of the slot 12 and rotation of the shaft 13 and head 16 relative to the blocking member 17 is resisted by the side faces of the portions 22 engaging the side faces of the head 16. The member 17 is itself non-rotatable relative to the members 10 and 11 by virtue of the engagement of the blocking portions 22 in the holes 12. The head 16 is thereby maintained in a position in which it cannot retract through the holes 12.

The nut 27 is then turned in a sense tending to retract the shaft 13 or draw it into the nut 27, tightening the connector 14 and applying tensile force to the shaft 13 as a result of the reaction of the nut 27 on the element 11 through the washer 18. The elements 11 and 12 are thus tightly clamped between the head 16 and the washer 18. The helical spring 28 is such that in the fully tightened condition, as seen in FIG. 4, it does not compress to a limiting or solid condition, so that contact is allowed between the collar portion 21 and the nut 27. In the locking or clamped position, the shaft 13 which is wider than the head portion 16 engages snugly or with small clearance in the widened central portions of slots 12 and serves to disallow lateral motion of the elements 10 and 11 relative to one another.

Preferably the rear end of the shaft 13 is provided with a linear mark such as a transversely extending rib 33 which is visible through the bore 26 in the nut 27 and provides the user with a visual indication of the position of the head 16, which can be checked from one side of one of the elements 11, without needing to have access to or sight of the head 16 on the opposite side.

As will be appreciated, the connector as described above can be applied and actuated from one side of one of the elements 11, without needing access to or manipulation from the opposite side. Further, the connector is simple to operate and may be applied using only one hand.

In the preferred form, the shaft 13 including the head 16, the blocking member 17 including the washer and collar portions 18 and 21, and the nut 27 are each integral moldings from plastics material having adequate strength properties. For example, they may be molded from nylon.

The connector as described above may be employed for connecting an element such as the element 11 to other generally plate form members such as to an arm of a generally angle bracket section corner structure. In such use, the arm of the other member is punched or otherwise formed with elongated slots similar to or compatible with the slots 12.

Various modifications may be made to the connector as described above in detail, as will be appreciated by those skilled in the art.

For example, instead of being of simple rectangular form, the head 16 and the slots 12 may be generally cruciform, and the blocking portions 22 may comprise four equiangularly spaced portions adapted to register with and receive the cruciform head in the assembled and insertion positions and to receive the portions of the cruciform head between them in the retracted and locking positions. Other configurations are of course possible.

I claim:

1. A connector for two juxtaposed elements each provided with an elongated hole therethrough, comprising: a rotation blocking member having a washer portion adapted to be applied on an outer face of one of the juxtaposed elements and a blocking portion extending from the washer portion and through said holes; a shaft having at one end a laterally elongated head portion and rotatable from an insertion position wherein the head portion is in register with the blocking portion to a locking position wherein the head portion is displaced rotationally relative to the blocking portion, and engages on an outer face of the other of said elements adjacent said elongated hole, an end of the shaft opposite said head portion extending through an aperture in the washer portion and said shaft in said locking position being reciprocable relative to the washer portion from an extended position wherein said head portion extends beyond said blocking portion to a retracted position wherein said head portion extends alongside said blocking portion and engages a lateral face of said blocking portion, whereby a rotational movement of said shaft in at least one direction about its axis is blocked; and a reaction member engaging said end of the shaft opposite said head portion and operative to react with said rasher portion to urge said shaft in the direction from said extended position toward the retracted position on rotation relative to the shaft in said at least one direction, said reaction member on rotation in said at least one direction rotating said shaft member from the insertion position to the locking position and reacting with the washer portion to urge said shaft toward said retracted position whereby the two elements are compressively retained between the head portion and the washer portion.

2. A connector as claimed in claim 1 wherein the shaft is wider than the head portion and engages in an enlarged portion of the slots 3. A connector as claimed in claim 1 wherein the shaft member has an indicator member indicating the rotational position of the head portion in the form of a rib extending diametrically across said end of the shaft opposite the head portion.

4. A connector as claimed in claim 1 wherein the end of the shaft opposite the head portion is threaded and said reaction member comprises a nut threadedly engaging the shaft.

5. A connector as claimed in claim 4 wherein the nut is rounded and its outer surface is knurled.

6. A connector as claimed in claim 4 including biasing means between the washer portion and the reaction member tending to retract the shaft relative to the washer portion and retaining the head portion in engagement on an end face of the blocking portion in the insertion position.

7. A connector as claimed in claim 6 wherein the biasing means comprise a coil spring.

8. A connector as claimed in claim 1 wherein the blocking member comprises a plurality of blocking portions adapted to extend through said holes.

9. A connector as claimed in claim 8 wherein said head portion comprises a plurality of lobes adapted to be rotated from said insertion position wherein said lobes are in register with said blocking portions to said locking position wherein the shaft retracted relative to the blocking member and the lobes engage the side faces of said blocking portions.

10. A connector as claimed in claim 9 including detent means between the head portion and said lobes tending to retain the lobes in register with the blocking portions.

11. A connector as claimed in claim 10 wherein the detent means comprise a groove provided on a surface of each lobe opposing a blocking portion, and a projection on each blocking potation for engaging a respective groove.

* * * * *